Patented Apr. 8, 1952

2,591,988

UNITED STATES PATENT OFFICE 2,591,988

PRODUCTION OF TiO₂ PIGMENTS

Oswin B. Willcox, Wilmington, Del., assignor to E. I. du Pont de Nemours and Company, Wilmington, Del., a corporation of Delaware No Drawing. Application September 14, 1950, Serial No. 184,897

7 Claims. (Cl. 241—22)

This invention relates to the production of improved titanium dioxide pigments and to novel methods for preparing such pigments. More particularly, it relates to an improved process for dry grinding titanium oxide pigments in the presence of a novel form of grinding reagent adapted to improve the whiteness or color characteristics of the ground pigment product.

Commercial titanium dioxide pigments are manufactured by two processes. The older process comprises precipitating the titania by hydrolyzing an aqueous solution of a titanium salt such as the sulfate, followed by filtering, washing, and variously treating the hydrolysate in the wet state with minor amounts of agents, and eventually calcining said hydrolysate, at temperatures ranging from 750–1000° C., to develop essential pigment properties. The product resulting from the calcination invariably contains an undesirable amount of hard, gritty particles which are dispersed by resort to either wet or dry grinding treatment. Wet grinding breaks up such gritty particles but is disadvantageous for use because considerable expense is involved in the re-wetting of the calcined pigment and thereafter filtering and drying it. Furthermore, the drying step following wet grinding frequently causes cementation of agglomerates and some sort of disintegration milling treatment is required before a smooth-textured pigment product can be obtained. As a consequence, dry grinding treatment of the calcined product has gained considerable favor in the art. A more recent process for producing TiO₂ pigments comprises the oxidation, at relatively high temperatures, of a titanium halide, particularly titanium tetrachloride. Anhydrous TiO₂ is directly obtained from this process but because of the gritty material which also exists in the product, a grinding treatment must also be applied to it. For the reasons just mentioned, resort to dry grinding is also preferred for improving the pigment texture of the product from such oxidation process.

In carrying out the dry grinding operation, suspending liquids are dispensed with and various types of grinding apparatus adapted to reduce the pigment to desired fine, uniform particle size, such as ball mills, bar mills, roller mills, ring mills, and the like, are employed. More recently, fluid energy types of grinding mills have been utilized for this purpose in which the pigment particles are conveyed in a plurality of streams from jets by a gaseous fluid, such as air or steam, into the outer portion of an inwardly spiraling vortex at high velocity and in a manner which will maintain the vortex at a high rotative speed and a relatively small inward speed to cause the pigment particles to rub or strike against each other or against "breaker" plates within the apparatus. One useful type of such device comprises the micronizer mill described in U. S. Patent 2,032,827, in which superheated steam comprises a conveying gas for the pigment. These grinding machines are usually constructed of metals, such as steel, and frequently the grit present in the pigment under treatment is so abrasive that metal is ground off and causes the pigment to become undesirably discolored during the treatment. Since TiO₂ pigments are usually white or light-colored, this contamination causes a serious degradation of quality and renders the product unfit for many intended uses, especially as an ingredient of coating compositions, such as paints, enamels, lacquers, or finishes. Furthermore, the actual wear which is incurred on the mill parts is of serious magnitude. Pigments prepared by the high temperature oxidation of TiCl₄ are particularly affected and bad in these respects, the whiteness of such pigments having been known to deteriorate during "micronizing" to a dull gray color far below the lower limit of the usual visual scale for judging whiteness of pigments.

Heretofore, various substances have been suggested as useful pigment additives to serve as grinding aids whereby faster grinding and better dispersive properties of the ground pigment will be attained. However, none of these treating agents has proved satisfactorily effective or useful for purposes of this invention since it has been generally found that the more effective the grinding aid, the greater will be the wear incurred on the milling means and the worse the extent of product discoloration.

It is among the objects of this invention to overcome the above and other disadvantages characterizing prior pulverizing or grinding procedures and to provide a novel method for attaining these objects. Particular objects include: the provision of an improved process for dry grinding white titanium-containing pigments, especially titanium dioxide, in which the whiteness of the TiO₂ pigment will be effectively preserved and prevention had of excessive wear upon the grinding mill parts due to abrasion or erosion; the provision of an improved process of dry grinding wherein more complete grinding of the TiO₂ pigment and a more uniformly textured product will be obtained; and the provision of a novel form of $TiO_2$ pigment from which a more light- and heat-stable paint film can be had. Other objects and advantages will be apparent from the ensuing description of my invention.

These and other objects are attained in this invention which comprises improving the color and texture characteristics of a titanium pigment by pulverizing said pigment in the dry state in the presence of a small amount, say, from .05% to 5%, based on the weight of the pigment, of an aerogel.

In a more specific embodiment, the invention comprises mixing with pigment-developed, anhydrous $TiO_2$ from about 0.1% to 2.0%, by weight, of a substantially white silica or alumina aerogel, and dry-grinding the resulting mixture in a fluid energy type mill until desired smooth-textured pigment fineness results.

In practically adapting the invention, a relatively small amount, usually less than 5% and preferably less than 2%, based on the weight of the pigment being treated, of a substantially white aerogel is mixed with calcined, pigment-developed $TiO_2$ prior to subjecting such pigment to dry grinding treatment to improve its texture and fineness properties. Intimate association of the aerogel with the pigment can be conveniently effected through resort to mechanical blending in standard blending or mixing equipment, by passing the comixture through high speed mixers or disintegrators, or, if desired, the pigment and aerogel can be separately fed simultaneously and in the desired proportions to the dry grinding stage of the pigment-producing operation. The resulting pigment and aerogel co-mixture is then ground or pulverized in conventional pigment grinding equipment, preferably in a fluid energy mill, such as a micronizer, to obtain the pigment texture and fineness desired. As a result, the whiteness properties of the final pigment will be greatly improved with wear upon the milling means itself being advantageously reduced.

Since aerogels of both silica and alumina have been found markedly effective for accomplishing the beneficial results of the invention, such types of pigment treating agents are preferred by me. Thus, from about 0.1% to 2.0% by weight of a silica aerogel having a bulk density of less than about 25 pounds per cubic foot is conveniently added or otherwise incorporated in the $TiO_2$ pigment and the resultant mixture is then dry ground, as above indicated. In instances where the titanium dioxide pigment comprises a product resulting from the vapor phase oxidation of titanium tetrachloride in accordance with, for instance, the methods disclosed in U. S. Patents 2,488,439 and 2,488,340, use is preferred of an amount of alumina aerogel not exceeding about 2% by weight as the reagent. It is in its application to pigments from $TiCl_4$ oxidation that the present invention is outstandingly useful and satisfies particular and specific needs. As already noted, such pigments are very difficult to grind in fluid energy mills due to undesired loss of pigment brightness being incurred. This is effectively obviated when grinding of the pigment, as herein contemplated, is effected in the presence of a minor amount of an aerogel.

The aerogels which are usefully employable in this invention preferably comprise those derived from the substantially white, water-insoluble hydrous oxides of silicon and the metallic elements. The term "aerogel" refers to the particularly voluminous dried gel prepared from a large number of colloidal systems by removing the liquid from a gel under special conditions designed to prevent substantial shrinkage. A gel is a non-fluid system comprising a fluid phase and a solid phase, the solid phase being porous or web-like extending throughout the fluid phase and being formed by the coagulation of colloidal particles. It may be very soft or quite rigid depending upon the concentration and degree of gelation. When the fluid phase is water the system is called a hydrogel. The fluid may also be an organic liquid. These liquids may be replaced by a gas such as air. When a gel is dried by normal evaporation of the liquid, the gel shrinks to fifty or less per cent of its original volume and the dried microporous product is called a xerogel. An aerogel, however, is prepared by removing the liquid from a gel under special conditions which substantially prevent a large part of the shrinking encountered in preparing a xerogel. Among useful methods for effecting aerogel preparation, the procedures set forth by Professor S. S. Kistler disclosed in the 1932 publication of the Journal of Physical Chemistry, vol. 36, page 52, can be resorted to. According to that disclosure, the gel is placed under a pressure equal to or greater than the critical pressure of the liquid phase, the temperature is raised to or above the critical temperature and the vapor drawn off and replaced by air leaving the solid phase in the form of an aerogel which, in the case of silica, occupied about 80% of the volume of the original gel. An aerogel is characterized also by the fact that when it is resaturated by the liquid and dried normally a large shrinkage occurs, whereas a xerogel is substantially unchanged by this treatment, it having already undergone this shrinkage in its preparation. The aerogels are further characterized by their low bulk density, for example, the ordinary "silica gel" of commerce, which is a highly porous xerogel, has a density of from about 38 to 65 pounds per cubic foot, whereas silica aerogels have bulk densities from five to ten pounds per cubic foot. The bulk density of such aerogels may be varied considerably, that is, it may be increased from the very low range to the rather indefinite range of values between aerogels and xerogels by aging and partial drying of the initial gel. In their application to this invention, aerogels from the white, colorless, or very light-colored members of the species, such as those obtained from the hydrous oxides of aluminum and silicon, are preferred for use.

To a clearer understanding of the invention, the following specific examples are given. These are merely illustrative and not to be taken as in limitation of the invention:

Example I

One hundred pounds of a $TiO_2$ pigment produced by the oxidation of $TiCl_4$, in accordance with the procedures of the patents above referred to, were thoroughly mixed with one pound of a commercial silica aerogel prepared as outlined in the cited Journal of Physical Chemistry article. The resulting mixture was then dry ground by being fed through an 8" diameter stainless steel "micronizer" apparatus similar in construction to the device shown in U. S. Patent No. 2,032,827, and at a rate of ⅝ pounds per minute. Subsequently, and for purposes of comparison, an untreated batch of the same pigment was dry ground at the same rate and in the same machine. The following results were obtained from the two grinding operations:

|  | Brightness | p. p. m. Fe | Tinting Strength |
| --- | --- | --- | --- |
| Untreated TiO₂ | −35 | 200 | 185 |
| Treated TiO₂ | 14 | 64 | 195 |

The brightness values given were obtained visually by comparing pigments rubbed to a paste in oil. The usual arbitrary scale of values runs from about 8 to 20, 16 being of excellent whiteness and suitable for commercial use. One point on this scale is based on the least perceptible difference noticeable to the average trained person. The minus 35 value for the untreated sample was estimated from a set of temporary standards made by contaminating standard pigment and to show the relative improvement arising from the present invention. White pigments with a brightness value of 8 are considered poor. Parallel experiments using commercial "silica gel" of the xerogel class showed no significant preservation of pigment brightness during grinding. The tinting strength values given were obtained from the tests described on page 3 of U. S. Patent 2,046,054.

Example II

A titanium dioxide pigment similar to that used in Example I was mixed with 0.8% of its weight of an alumina aerogel and fed through an 8" stainless steel "micronizer" at ⅝ pounds per hour. Substantially the same preservation of brightness was obtained as compared with an untreated control. In addition, a marked resistance to discoloration on baking at high temperatures was found to result when the ground alumina aerogel-treated pigment was used in a normal baking enamel formulation.

While use in preferred of aerogels of silica and alumina, other aerogels or mixtures thereof belonging to the class derived from the substantially white, water-insoluble, hydrous oxides can also be employed. The specific elements, the hydrous oxides of which are utilizable herein, include, in addition to silicon and aluminum, titanium, zirconium, magnesium, zinc, cadium, tin, lead, antimony, bismuth, and the like. Aerogels being in the dry form are usually considered as comprising the anhydrous oxides of the elements mentioned. However, as is known in the case of xerogels, considerable water may be present, either adsorbed or chemically combined. This water may be present in the aerogels herein used as long as the amount thereof is not great enough to cause substantial shrinkage on normal drying, e. g., in a warming oven. Again, while the aerogels contemplated for use herein comprise those prepared by the above-mentioned method of Kistler, if desired other known and available methods of preparing this class of materials can be resorted to, since the invention, obviously, is not restricted to any method of preparing the aerogel.

The pigments to which this invention applies comprise the general class of calcined, white pigment and preferably those which contain titanium dioxide. Such TiO₂ pigments usually contain from 20% to 100% of commercial titanium dioxide as a prime pigment, with the remainder being made up of an alkaline earth metal sulfate or carbonate extender material, such as calcium carbonate, calcium sulfate, barium sulfate, or siliceous materials, and the like. The TiO₂ may be either in the anatase or rutile crystalline form and may result from the hydrolysis or oxidation processes referred to. While TiO₂ pigments, either alone or extended, are particularly contemplated for treatment herein, other forms of titanium pigments, including the various titanates, are also contemplated for treatment, with advantageous beneficial effects.

It will also be understood that although the invention is especially useful in the dry grinding of pigments in fluid energy or jet types of mills, such as those described in Perry's Chemical Engineers' handbook, 3d edition, pgs. 1145–47, in order to overcome the pigment quality impairment and excessive mill wear particularly experienced in such types of milling equipment, it has general application to other common types of pigment milling means, including ball mills, pebble mills, rod mills, etc., consisting of a rotatable shell containing a large number of loose, tumbling, grinding elements, as well as other forms of milling means in which reduction of pigment particle size can be effected.

The treatment of aqueous slurries of titanium dioxide pigments with alumina hydrate to prevent undesirable paint film characteristics such as baking discoloration, excessive weathering rate, and darkening on exposure to light, is already known (U. S. Pat. 2,187,050). This treatment, however, is limited to wet pigment preparations since, as the patentee points out, the dry addition of alumina does not give the patentee's results, as when alumina is precipitated in the aqueous pigment slurry. It has now been found that by using alumina in the aerogel form as herein contemplated and subjecting the pigment mixture to dry grinding, new and unexpected benefits are realized. Thus, not only is impairment in pigment brightness overcome, and a noticeable increase in tinting strength obtained, but a new, simplified method of rendering titanium dioxide-containing pigments more light and heat-stable in paint films is provided. An unexpected advantage lies in the fact that the use of an aerogel minimizes abrasion and erosion of metal parts in fluid energy mills. This is doubly advantageous in that not only is the mill protected, but the color of the white pigments being ground is preserved. These results are quite unexpected, especially in connection with the alumina aerogels. It is therefore difficult to propose a theory in explanation of the action of this new class of agents. Their behavior may be related to their very low bulk density which suggests very thin-walled capillary structure. These fragile walls may, during grinding, leaf onto the pigment and perhaps also onto the mill surfaces and thus achieve the interesting effects herein accomplished. Another explanation might be that the aerogels are more chemically active than, for example, xerogels, and are able to attach to the surfaces by chemical bonds of perhaps a secondary nature. While proof of these theories is presently unavailable, it is positively established that the beneficial effects obtained herein by grinding in the presence of aerogels cannot be had by substituting xerogels therefor.

It has also been proposed to add ground silica gel to a paint to obtain a flat film surface. However, such treatment does not provide the results of this invention and to obtain the desired flatting effect, about eight to ten per cent by weight of the agent must be added to the whole paint formulation. This corresponds to as high as twenty-five per cent on the basis of the titanium dioxide pigment present. In contrast to this, I employ but a relatively small amount of aerogel, not over 5% and usually under 2% of the weight of the pigment, and in addition to obtaining the advantages already mentioned, procure enamel films having very high gloss from the pigments treated in accordance with this invention.

I claim as my invention:

1. A process for the preparation of an improved calcined white titanium pigment which comprises dry grinding said pigment in the presence of from .05 to 5%, based on the weight of the pigment, of an aerogel.

2. A process for the preparation of an improved calcined white titanium dioxide pigment which comprises mixing with said pigment not more than 5% by weight of a substantially white aerogel and subjecting the resulting mixture to dry milling treatment until a fine-textured product is obtained.

3. A process for the preparation of an improved calcined white titanium dioxide pigment which comprises adding to said pigment not more than 5% by weight of silica aerogel and subjecting the resulting mixture to fluid energy dry milling.

4. A process for the preparation of an improved calcined white titanium dioxide pigment which comprises adding to said pigment not more than 5% by weight of alumina aerogel and subjecting the mixture to fluid energy dry milling.

5. A process for the preparation of an improved calcined white titanium dioxide pigment which comprises adding to said pigment from about .1% to 2% by weight of silica aerogel and subjecting the resulting mixture to fluid energy dry milling.

6. A process for the preparation of an improved calcined white titanium dioxide pigment which comprises adding to said pigment from about .1% to 2% by weight of alumina aerogel and subjecting the mixture to fluid energy dry milling.

7. A process for the preparation of a titanium dioxide pigment of improved fineness, brightness, yellowing resistance and durability in paint films which comprises adding to a titanium dioxide pigment resulting from the oxidation of titanium tetrachloride not more than 2% by weight of an alumina aerogel and subjecting the resulting mixture to dry grinding in a fluid energy type mill.

OSWIN B. WILLCOX.

REFERENCES CITED

The following references are of record in the file of this patent:

UNITED STATES PATENTS

| Number | Name | Date |
| --- | --- | --- |
| Re. 21,427 | McKinney | Apr. 16, 1940 |
| 2,346,085 | Sawyer | Apr. 4, 1944 |